Patented July 18, 1944

2,354,133

UNITED STATES PATENT OFFICE 2,354,133

PROCESS FOR PRODUCING ALUMINA FROM CLAY

Sanford C. Lyons, Bennington, Vt., assignor to Georgia Kaolin Company, Elizabeth, N. J., a corporation of Georgia No Drawing. Application May 22, 1943,
Serial No. 488,089

9 Claims. (Cl. 23—141)

The object of this invention briefly stated is to produce alumina ($Al_2O_3$) from clay in a suitable state of purity to be used in the production of the metal aluminum by standard methods. Alumina destined for that use must have a very high quality of chemical purity. The specifications relating to contents of iron, potassium, magnesium and calcium are particularly stringent and a condition corresponding almost to chemically pure is required in respect to iron and potassium.

While aluminum is the third most widely distributed element in nature, the combinations in which it is found are so difficult of reduction economically that thus far the only commercially available source has been bauxite. Many attempts have been made to utilize other raw materials, such as high silica bauxites, clays, etc., but all have encountered serious difficulties in the separation of objectionable impurities, particularly iron and potassium, such as to make their use prohibitively expensive.

I have invented and developed a method applicable to certain types of raw material which are available in extensive quantities, which is simple and effective and by which alumina very nearly free from the salts of potassium, iron, calcium, etc., and other impurities is obtained. This method is particularly effective with clays containing a relatively high content of alumina and a small content of potassium oxide. More particularly I have found that in the central region of Georgia and South Carolina there are clay deposits, described by geologists as being of cretaceous origin, and other deposits of the lower Wilcox formation of the tertiary age, of enormous magnitude, containing hundreds of millions of tons suitable for the production of alumina by my process. The raw material which I prefer to use is a crude kaolin from either the Sandersville, the Dry Branch or the Andersonville district of central Georgia. These kaolins possess a comparatively high content of alumina, generally at least as much as 38%, and occasionally as high as 50%, and their contents of iron oxide, potassium oxide, calcium oxide and magnesium oxide are each less than 1%. An approximate analysis of a sample of typical cretaceous clay is the following:

| | Per cent |
|---|---|
| Combined water | 13.8 |
| Alumina ($Al_2O_3$) | 38.5 |
| Silica ($SiO_2$) | 44.5 |
| Iron ($Fe_2O_3$) | 0.25–0.75 |
| Titanium ($TiO_2$) | 1.35–1.9 |
| Potash ($K_2O$) | Less than 1.0 |
| Calcium ($CaO$) | Less than 1.0 |
| Magnesium ($MgO$) | Less than 1.0 |

The foregoing statement of preference as to the source of material is not to be construed as a limitation of the utility of the invention. While the process later described is particularly effective with clays having a composition substantially corresponding to the foregoing analysis, it is likewise applicable to other clays having more or less widely varying compositions.

The first step of the method is digestion of the raw material with sulphuric acid. Without intending to indicate narrow limitations, I may say that acid of specific gravity in the order of 40° Bé. is suitable. The amount of acid used is slightly in excess of that indicated by arithmetical calculation as sufficient to combine with the alumina content of the particular crude material being used.

I have found that these clays vary more or less in their susceptibility to attack by the sulphuric acid. Some clays yield a considerably higher percentage of free alumina if they are calcined to a temperature in the neighborhood of 800° C. for about two hours preliminary to being subjected to the acid treatment; while other clays yield most of their alumina to the acid without prior conditioning. As a general, but not infallible rule, I have found that the clays which are lowest in alumina content appear to be most improved in their reactivity toward sulphuric acid by the calcining treatment, and vice versa.

From the foregoing it will be seen that a modification of the process consists in the pretreatment of the raw material by heat before subjection to the sulphuric acid reaction.

In performing the acid digestion I prefer to carry it on under pressure greater than atmospheric and at a temperature considerably higher than the atmospheric boiling point. For example, temperatures in the neighborhood of 200° C. and pressures corresponding to those elevated temperatures, produce a definitely higher extraction of alumina and effect the extraction in considerably less time than is accomplished by acid boiling at atmospheric pressure.

The product of this treatment is a solution consisting mainly of aluminum sulphate and the sulphuric acid salts of impurities, mixed with insoluble siliceous residue. This solution is separated from the residue by any suitable known method; for example, by pressure filters, counter-current rinsing in thickeners, etc. When a filter press is used, it is desirable to repulp the siliceous filter press cake with water, one or more times, to remove the considerable amount of aluminum salt which is entrapped in the cake. It is also desirable, particularly if an excess of sulphuric acid has been used in the original digestion, to add to the solution prior to the filter operation enough aluminum oxide to react with most of the excess acid, in order to diminish corrosive attack of the acid liquor on the filter medium.

The second principal step is to add ammonium sulphate to the clear solution resulting from the acid digestion step. It may be noted that the acidity of the solution of aluminum sulphate and impurities is preferably controlled so that its pH value is lower than 3.0. The ammonium sulphate is added in a concentrated hot solution at a temperature in the order of 80° C., in an amount sufficient to form a double sulphate of aluminum and ammonium with all the aluminum which is present in the first solution.

The ammonium alum so produced is a peculiarly effective means for accomplishing separation of the content of iron in the solution. It is approximately only half as soluble in water at 20° C. as are some of the ferruginous salts present, so that the two can be separated by differential crystalization. This would be the case in large measure even if the concentration of iron were actually as high as that of the aluminum in the solution. Even without further treatment, a surprisingly effective elimination of the iron may be attained.

However, the separation thus effected is not sufficiently complete to enable the resulting alumina to meet the most stringest specifications for alumina destined to produce aluminum metal, wherefore I employ a third step to improve that condition. This third step consists in adding a small quantity of sodium hyposulphite ($Na_2S_2O_4$), in an amount sufficient to react with all the iron present. This may be substantially or roughly equal to the weight of ferric oxide in the solution. This sodium compound has two important effects. One effect is that the ferruginous salts present are made more soluble and more stably soluble. The reason for this unexpected result is not entirely clear, inasmuch as it is unlike the results produced by known reducing agents. For instance, treatment with sodium bisulphite ($Na_2HSO_3$), using an amount of which the content of the oxide of sulphur is somewhat greater than that in the amount of sodium hyposulphite above stated, left much more (from two to more than three times as much) iron in the finished product than the hyposulphite treatment. Likewise a treatment where sulphur dioxide gas was used instead of sodium hyposulphite, in an amount corresponding to more than the sulphur oxide content of the sodium hyposulphite, yielded a finished product containing about three times as much iron as the treatment with hyposulphite. The other beneficial effect noted is that the hyposulphite reaction in solutions of the relatively low pH value here treated yields decomposition products—possibly sulphides, etc.— which combined with certain salts of other heavy metals which may be present in the solution, forming insoluble compounds which are capable of easy separation. The resulting precipitates are removed by filtration while the alum solution is hot. Then the solution is cooled so as to allow the aluminum ammonium sulphate to crystallize. Preferably the solution while cooling is stirred so that the resulting crystals will be fine, in order to diminish the tendency for entrapment of mother liquor within the crystals. When separated cleanly from the mother liquor, the solid crystals, upon analysis, show a surprisingly low content of iron and practically no silica, calcium or other impurities.

Separation of the crystals of aluminum ammonium sulphate may be effected in various ways. One extremely efficient mode, from the point of view of both functional and economical efficiency, is to pass the crystal slurry through a continuously operating screen type centrifuge with means for propelling the crystals longitudinally along the inner face of the rapidly rotating foraminous basket. Wash water may be sprayed against the rotating mass of crystals to complete the removal of the vestiges of mother liquor adhering to their surfaces.

Any impurities which may be present in the crystal slurry will be contained almost entirely in solution in the mother liquor. Hence the more thoroughly and effectively the mother liquor is eliminated from the crystals in the centrifuge, the greater will be the purity of the resulting alum crystals and the reduction of the number of recrystallization stages needed to obtain the desired degree of ultimate purity.

For greater refinement the third step may be repeated one or more times by dissolving the alum crystals in clean hot water, adding sodium hyposulphite (but in smaller proportional amounts than at first), recrystallizing, and again separating the crystals from the mother liquor. In this way there may be obtained an ammonium alum crystal, which can be made to yield alumina as pure as, or purer than, that obtained from bauxite by the standard Bayer process.

The fourth and final step is the destructive distillation of the alum to recover alumina. In performing this last step the alum crystals are first liquefied by heat (at a temperature in the neighborhood of 100° C.) to form a clear almost water-like liquid. In the preferred further procedure, this liquid is projected through a nozzle as a spray into a chamber heated to slightly above 400° C. This constitutes the first stage of calcination, during which the particles of spray are solidified to a white friable mass which readily crumbles into powder. The powdery matter is anhydrous aluminum-ammonium sulphate.

The anhydrous powder is heated further at a temperature between 400° C. and approximately 600° C. until white odorless fumes of ammonium sulphate are released, and thereafter for as long a time as such fumes continue to appear. These fumes may be separately collected and reconverted into ammonium sulphate solution available for use in treating further batches of aluminum sulphate solution in accordance with the second step precedently described.

As the heating is continued, the white fumes of ammonium sulphate eventually cease to appear. This condition marks the substantially complete elimination of ammonium sulphate. Thereupon the temperature is raised to a degree in the order of 1000° C., whereupon other white fumes, having a pungent stinging odor appear. These fumes are composed principally of sulphuric anhydride ($SO_3$). They may be separately collected and absorbed in water to yield sulphuric acid which can be used in treating raw clay according to the first step of this method.

The material which remains after this final stage of calcination is essentially pure aluminum oxide. It is a white powdery mass and is pure enough for most practical commercial purposes, including the production of the metal aluminum. However, it may be still further refined by being dropped into water while still hot. Any small traces of soluble salts which may remain with the alumina will then be removed; the amount so removed depending upon the purity of the original raw material, or the efficiency of the purifying step of crystallization, or both. This last step is particularly desirable or necessary in connection with many clays or shales containing a relatively high percentage of potash, such as some primary clays and certain shales. When this last described leaching procedure is used, the alumina is recovered from the water by filtration, by centrifugal or other suitable mode of operation, dried and calcined, whereupon it is ready for use.

An alternate modification of the calcination step last described consists in heating the fused ammonium-aluminum sulphate in a container to dryness, instead of spraying it into a hot chamber, as the first stage. The further stages of calcination are the same as above described. This alternative method, while less desirable than the one first described, is within the scope of the invention for which I claim protection.

The alumina resulting from the herein described process is the desired end product. It is convertible into the metal aluminum by any of the procedures heretofore used in connection with aluminum. It lacks only a small fraction of one percent. of being chemically pure. The following is a typical analysis of finished alumina made from the raw clay of which the analysis is given at an earlier point in this specification:

| | Percent |
|---|---|
| Iron ($Fe_2O_3$) | 0.013–0.14 |
| Potash ($K_2O$) | 0.12 |
| Silica ($SiO_2$) | 0.039 |
| Magnesia (MgO) | 0.0058 |
| Calcium (CaO) | 0.015 |
| Titanium ($TiO_2$) | 0.01 |
| Alumina ($Al_2O_3$) | The balance |

The range of proportional iron content shown in the foregoing analysis depends on the number of recrystallization stages of the alum in the third step of the method. And the number of recrystallizing steps taken depends on the use to which the finished product is to be put.

The process is not only efficient chemically, but it is economical commercially, being regenerative in the sense that the principal chemical reagents employed in the process are largely recovered at a later stage and are cheaply reconditioned for use in treating additional raw material.

What I claim and desire to secure by Letters Patent is:

1. The method of obtaining alumina from clay, which consists in digesting the clay with hot sulphuric acid, separating the solution of salts so obtained from the insoluble siliceous residue, adding ammonium sulphate to said solution to form double sulphates, adding sodium hyposulphite to the solution of double sulphates and thereby precipitating the salts of certain impurities, separating the insoluble precipitate from the solution, separating aluminum ammonium sulphate from compounds of iron by differential crystallization, and calcining the separater alum crystals to drive off ammonium sulphate and sulphuric anhydride.

2. The method of obtaining substantially pure alumina from clay containing between 30% and 55% alumina with iron and other impurities, which consists in digesting the clay in sulphuric acid at a pressure higher than atmospheric and a temperature higher than the boiling point at atmospheric pressure, separating the resulting solutions from the insoluble residue of the clay, adding hot concentrated solution of ammonium sulphate in amount sufficient to form a double sulphate of aluminum and ammonium with all the aluminum present in the solution, adding sufficient sodium hyposulphite to react with the ferric oxide in the solution and precipitate other impurities, removing the impurities from the solution, cooling the solution to cause formation of aluminum-ammonium sulphate crystals, separating said crystals from the mother liquor, liquefying the separated crystals by heat, further heating the liquid so produced to dryness, and further heating the dried residue until ammonium sulphate and sulphuric anhydride are driven off and alumina remains.

3. The method of producing substantially pure alumina from clay containing alumina in the order of from 30% to 50% with minor contents of iron and other impurities, which consists in digesting the clay with hot sulphuric acid, separating the resulting solution from the insoluble residue, adding hot ammonium sulphate to said solution, adding sodium hyposulphite to the solution, filtering the solution to remove precipitated impurities, cooling the solution, separating the crystals then resulting from the mother liquor, and calcining the separated crystals at a temperature in the order of more than 400° C. until ammonium sulphate is driven off, and further heating the residue at a temperature in the order of 1000° C. until sulphuric anhydride is driven off.

4. In the procedure of separating alumina from clay with the digestion of the raw clay in hot sulphuric acid, the steps of forming double sulphates of the products of digestion by adding hot ammonium sulphate solution to the solution resulting from the sulphuric acid digestion, adding sodium hyposulphite to precipitate impurities, separating the precipitate from the solution while the latter is hot, and cooling the solution sufficiently to cause crystallization of the aluminum salts while salts of iron remain largely in solution.

5. The method of extracting alumina from cretaceous or tertiary kaolin, which consists in first calcining the raw material to a temperature in the order of 800° C. for a period in the order of two hours, boiling the calcined clay in sulphuric acid having a specific gravity in the order of 40° Bé. separating the resulting solution from the insoluble residue of the clay, adding to said solution a concentrated hot solution of ammonium sulphate at a temperature in the order of 80° C. in amount sufficient to form double sulphates of the metals in the solution, adding to the resulting solution a minor quantity of sodium hyposulphite, filtering the solution while hot, cooling the filtered solution to a temperature low enough to cause crystallization of the aluminum-ammonium sulphate in the solution, separating the crystals from the mother liquor with substantially complete removal of adherent mother liquor, dissolving the separated crystals in water and heating, treating the solution thereby produced with sodium hyposulphite, filtering the said solution while hot, and recrystallizing its content of alum, and calcining the resultant crystals at successively higher temperatures until first ammonium sulphate and then sulphuric anhydride are driven off.

6. The method of extracting alumina from cretaceous or tertiary kaolin, which consists in boiling the raw material in sulphuric acid of which the specific gravity is in the order of 40° Bé. at a temperature higher than the boiling temperature at atmospheric pressure, separating the resulting solution from the insoluble residue of the clay, adding to said solution a concentrated hot solution of ammonium sulphate at a temperature in the order of 80° C. in amount sufficient to form double sulphates of the metals in the solution, adding to the resulting solution a minor quantity of sodium hyposulphite, cooling the filtered solution to a temperature low enough to cause crystallization of the aluminum ammonium sulphate in the solution, separating the crystals from the mother liquor with substantially complete removal of adherent mother liquor, dissolving the separated crystals in water, heating the solution so produced, treating the last named solution with sodium hyposulphite, filtering the said solution while hot, recrystallizing the content of alum in said solution, and calcining the crystallized alum at successively higher temperatures until first ammonium sulphate and then sulphuric anhydride are driven off.

7. The method set forth in claim 1, combined with the further steps of recovering the fumes of ammonium sulphate and sulphuric anhydride driven off in the calcining step.

8. The method set forth in claim 1, combined with the further step of collecting the fumes of ammonium sulphate and reconverting said collected fumes into ammonium sulphate solution suitable for use in treating further batches of the aluminum sulphate solution.

9. The method set forth in claim 1, combined with the further step of collecting the fumes of sulphuric anhydride driven off in the calcining step and absorbing the collected fumes in water to yield sulphuric acid.

SANFORD C. LYONS.